United States Patent [19]
Fitzpatrick et al.

[11] Patent Number: 5,438,658
[45] Date of Patent: Aug. 1, 1995

[54] METHOD AND SYSTEM FOR TIME CRITICAL RESPONSE MANAGEMENT IN A DATA PROCESSING SYSTEM

[75] Inventors: Greg P. Fitzpatrick, Fort Worth; William J. Johnson, Flower Mound; Marvin L. Williams, Lewisville, all of Tex.

[73] Assignee: International Business Machines Corporation, Armonk, N.Y.

[21] Appl. No.: 976,224

[22] Filed: Nov. 13, 1992

[51] Int. Cl.6 .............................................. G06F 17/00
[52] U.S. Cl. .................................... 395/153; 375/154; 375/155
[58] Field of Search ............................... 395/144–149, 395/153–158, 600, 926, 161, 159; 364/940.9 MS File; 370/79, 91

[56] References Cited

U.S. PATENT DOCUMENTS

| | | | |
|---|---|---|---|
| 3,702,010 | 10/1972 | Schmidt et al. | 444/1 |
| 4,965,772 | 10/1990 | Daniel et al. | 364/900 |
| 4,980,855 | 12/1990 | Kojima | 364/900 |
| 5,107,419 | 4/1992 | MacPhail | 395/600 |
| 5,123,086 | 6/1992 | Tanaka et al. | 395/155 |

OTHER PUBLICATIONS

Edwards, W. K. "The Design & Implementation of the Montage Multi Media Mail System" Proceedings TRI-COMM 91 IEEE Conf. on Comm's Software: Comm's for Dist. Appl.'s & Systems pp. 47–57, Publ: IEEE New York N.Y.

Lockwood, Rus "PC-& Post for Windows: Hassle Free E Mail" PC Sources Magazine Sep. 92 vol. 3 No. 9 p. 415.

Lockwood, Russ "Multimedia in Business. The New Presentations" Personal Computing Magazine Jun. 29, 1990 pp. 116–126.

Primary Examiner—Mark K. Zimmerman
Assistant Examiner—Chris Wrate
Attorney, Agent, or Firm—Norman L. Gundel; Andrew J. Dillon

[57] ABSTRACT

A method and system for efficiently managing a time critical response to a distribution within a data processing system. The amount of time required to present a distribution to a recipient is determined in response to a receipt of that distribution at the user's station. Next, a specified time for response, action date or invalidation date is determined and a latest possible presentation initiation time is calculated which permits completion of the presentation of the distribution prior to the specified time for response or invalidation. An audible and/or textual notification is then generated and presented to the user prior to the calculated latest possible presentation initiation time, such that the user may efficiently respond to the distribution prior to the specified time for response.

12 Claims, 3 Drawing Sheets

METHOD AND SYSTEM FOR TIME CRITICAL RESPONSE MANAGEMENT IN A DATA PROCESSING SYSTEM

BACKGROUND OF THE INVENTION

1. Technical Field

The present invention relates in general to an improved data processing system and in particular to an improved method and system for managing a response by a user to receipt of a distribution within a data processing system. Still more particularly, the present invention relates to a method and system for managing time critical responses to distributions within a data processing system.

2. Description of the Related Art

Modern distributed computer systems are rapidly supplanting the mail system for the transmittal and reception of electronic notes, letters, documents or other computer files. Such systems often permit thousands of users to be enrolled at user stations which may be widely geographically distributed.

Each of these enrolled users has the capability of transmitting notes, letters or documents to a selected user within the network, accessing the electronic calendars for other users or accessing common computer applications which are available within the distributed data processing system. As in ordinary mail systems a user may transmit an electronic note, letter or document to another user and specify a due date for some activity or response date by which the originator of the note or letter desires a response from the recipient.

One example of such a system is disclosed in International Business Machines Technical Disclosure Bulletin of February, 1990, page 345–347. In the system disclosed therein, a user may transmit an electronic note or letter which includes a proposed date for response by the recipient. This system permits such dates to be considered tentative until the recipient and the originator agree on a selected date for response. In this manner, a time critical response to an electronic distribution may be entered into the recipient's system and utilized to track the response of the recipient to the various notes, letters or documents.

With the increasing complexity and capability of distributed data processing systems, the utilization of so-called "multimedia" distributions throughout such systems is becoming increasingly common. By "multimedia" what is meant is a distribution which may include audio, video and textual content. As those skilled in the art will appreciate such multimedia distributions often convey information that is time related. As with ordinary distributions these time related attributes may include an Action Due Date, a Reply-by-Date, and an Invalidation Date. Additionally, multimedia presentations also include timing characteristics which form the basis for the information. For example, a series of video frames which must be presented in a particular order and at a particular speed in order to convey the desired information. Thus, it should be apparent that there is an associated time of presentation required for the information within a multimedia presentation to be conveyed to a user. For example, a multimedia presentation may comprise an audio and video presentation which is twenty minutes in length. In such a situation, at least twenty minutes will be required for the recipient to view the entire presentation and respond thereto.

In view of the timing characteristics of a multimedia presentation an additional level of complexity is created for responses to such presentations. For example, a multimedia distribution which is "opened" at 11:00 a.m. and which has a playing time of two hours cannot be viewed prior to 1:00 p.m. Thus, if the Reply-By-Date for that presentation is 12:00 p.m. of that day, the recipient cannot possibly respond in a timely fashion. Further, it is both undesirable and inefficient to play or present multimedia distributions which will expire prior to completion of the presentation.

In view of the above, it should be apparent that a need exists for a method and system which permits a recipient to receive a preemptive warning which permits that recipient sufficient time to view a presentation of a multimedia distribution prior to a mandatory response time or the invalidation of that data.

SUMMARY OF THE INVENTION

It is therefore one object of the present invention to provide an improved data processing system.

It is another object of the present invention to provide an improved method and system for managing a response by a user to receipt of a distribution within a data processing system.

It is yet another object of the present invention to provide an improved method and system for managing time critical responses to multimedia distributions within a data processing system.

The foregoing objects are achieved as is now described. The method and system of the present invention permit the efficient managing of a time critical response to a distribution within a data processing system. The amount of time required to present a distribution to a recipient is determined in response to a receipt of that distribution at the user's station. Next, a specified time for response, action date or invalidation date is determined and a latest possible presentation initiation time is calculated which permits completion of the presentation of the distribution prior to the specified time for response or invalidation. An audible and/or textual notification is then generated and presented to the user prior to the calculated latest possible presentation initiation time, such that the user may efficiently respond to the distribution prior to the specified time for response.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
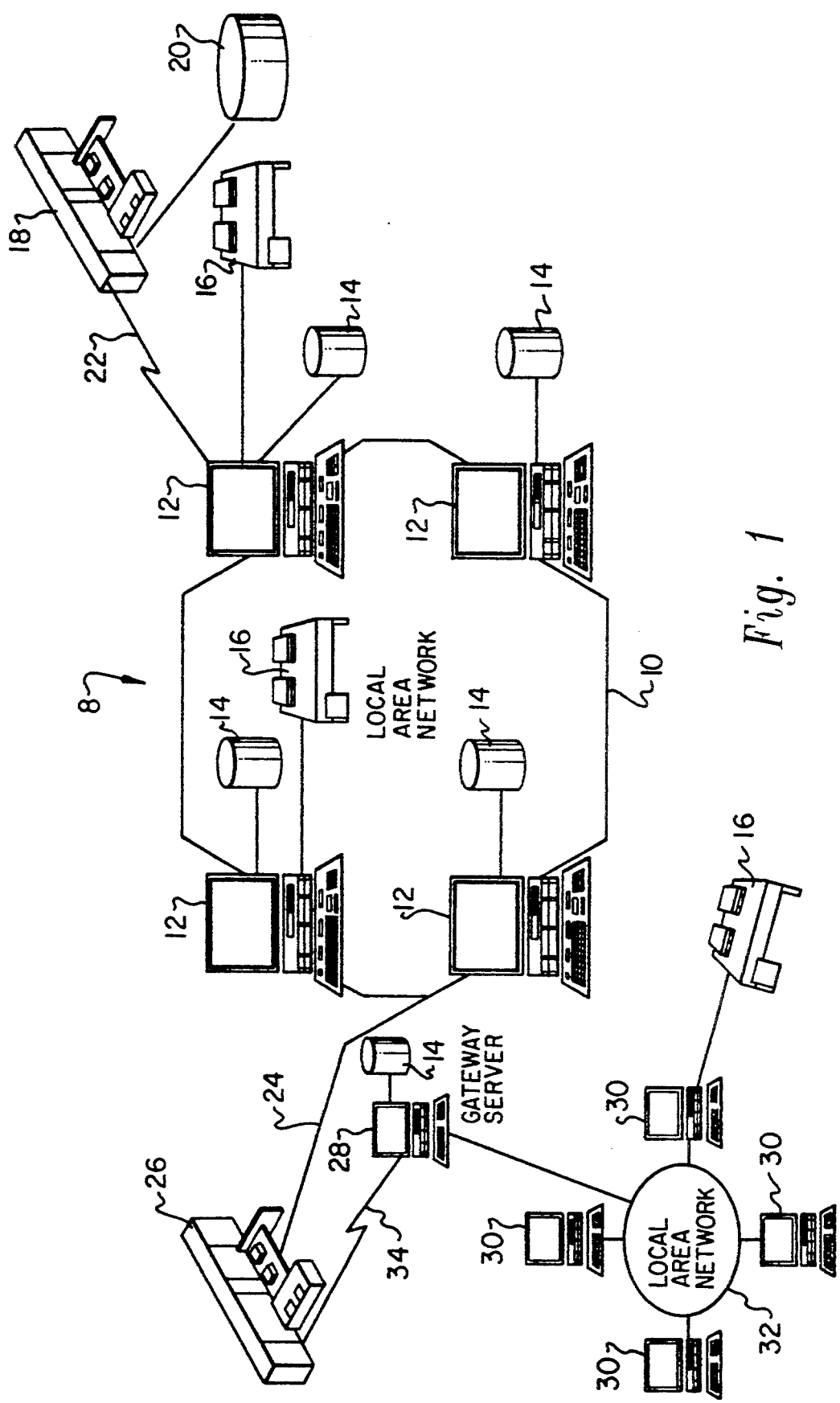
FIG. 1 is a pictorial representation of a distributed data processing system which may be utilized to implement the method and system of the present invention.

With reference now to the figures and in particular with reference to FIG. 1, there is depicted a distributed data processing system 8 which may be utilized to implement the method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may also be utilized for each such network.

As is common in such data processing systems, each individual computer may be coupled to a storage device 14 and/or a printer/output device 16. One or more such storage devices 14 may be utilized, in accordance with the method of the present invention, to store the various data objects and multimedia distributions which may be periodically accessed and processed by a user within data processing system 8, in accordance with the method and system of the present invention. In a manner well known in the prior art, each data object or multimedia presentation may be stored within a storage device 14 which is associated with a Resource Manager or Library Service which is responsible for maintaining and updating all objects and presentations which may be distributed throughout data processing system 8.

Still referring to FIG. 1, it may be seen that data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network 10. Mainframe computer 26 may be coupled to Local Area Network (LAN) 10 via communications link 24 and via communications link 34 to a gateway server 28. Gateway server 28 is preferably an individual computer or Intelligent Work Station (IWS) which serves to link Local Area Network (LAN) 32 to Local Area Network (LAN) 10.

As discussed above, with respect to Local Area Network (LAN) 32 and Local Area Network (LAN) 10, a plurality of multimedia presentations or distributions may be stored within storage device 20 and controlled by or transmitted by mainframe computer 18, as Resource Manager or Library Service for the multimedia presentations and distributions thus stored. Of course, those skilled in the art will appreciate that mainframe computer 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

Figure 2:
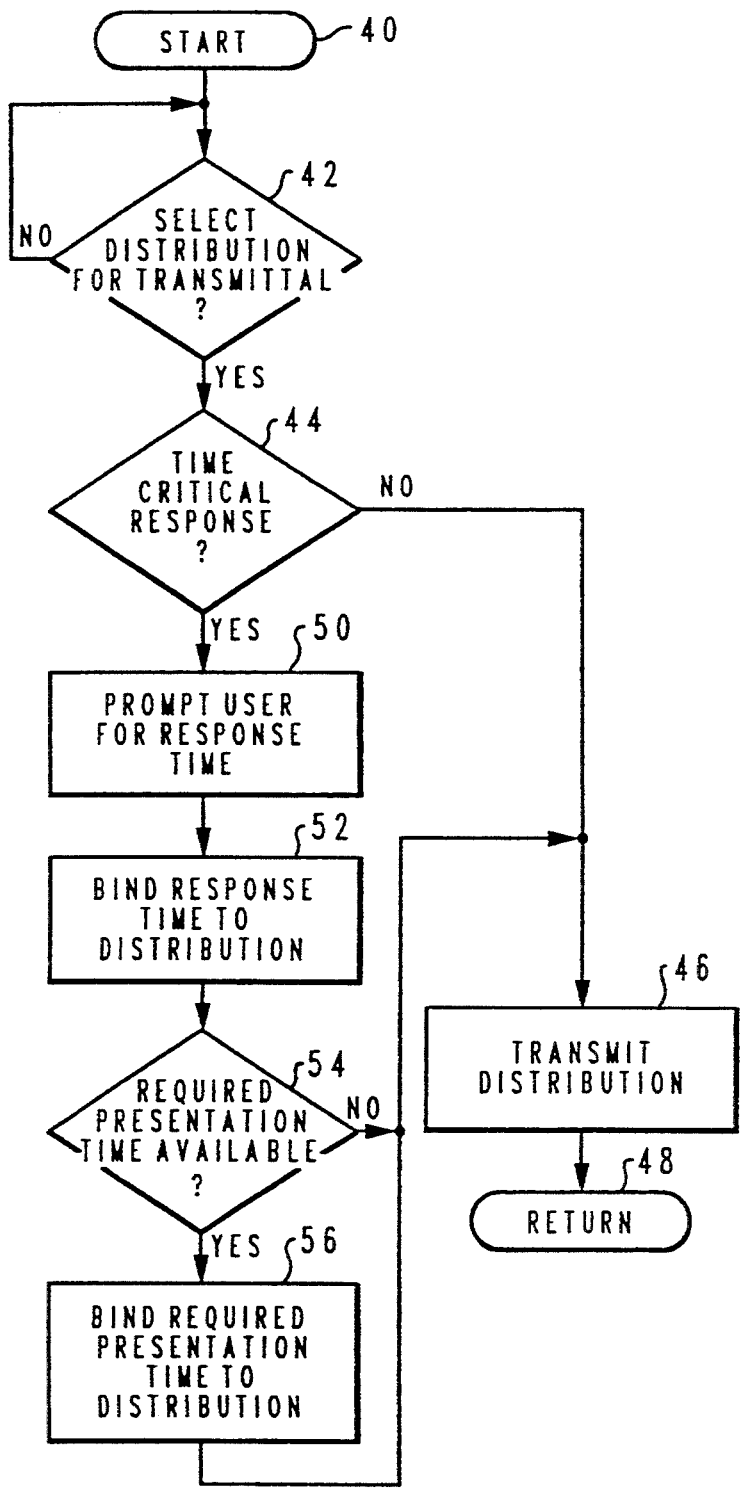
FIG. 2 is a high level logic flowchart illustrating the transmittal of a distribution within a data processing system in accordance with the method and system of the present invention.

Referring now to FIG. 2, there is depicted a high level logic flowchart illustrating the transmittal of a distribution within a data processing system in accordance with the method and system of the present invention. As illustrated, the process begins at block 40 and thereafter passes to block 42. Block 42 illustrates a determination of whether or not a distribution has been selected for transmittal within the data processing system. If not, this process merely iterates until such time as a distribution has been selected for transmittal. Still referring to block 42, in the event a distribution has been selected for transmittal within the data processing system, the process passes to block 44.

Block 44 illustrates a determination of whether or not a time critical response to the distribution is required. As utilized herein, the term "response" shall mean an action which is due, a reply which is due, or the timed invalidation of the distribution, at some selected time in the future. In the event a time critical response is not associated with the selected distribution, the process passes to block 46. Block 46 illustrates the transmittal of the distribution and the process then returns, as depicted at block 48.

Referring again to block 44, in the event a time critical response is associated with the selected distribution, the process passes to block 50. Block 50 illustrates the prompting of the user for a response time. As described above, the response time may constitute a time prior to which an action is required, a time prior to which a response to the distribution is required or a time at which the distribution will become invalid. Thereafter, the process passes to block 52.

Block 52 illustrates the binding of the designated response time to the distribution and the process then passes to block 54. Block 54 depicts a determination of whether or not a required presentation time is available for the distribution. Those skilled in the art will appreciate that the required presentation time may merely constitute the run time for a multimedia or audio presentation or, may constitute the amount of time typically required to read a textual distribution. This amount of time may be simply calculated by determining the number of words within a textual distribution and dividing that number by an average reading speed or a reading speed entered by the user. Thereafter, the process passes to block 56 which illustrates the binding of the required presentation time to the distribution.

After binding the required presentation time to the distribution or, in the event a required presentation time is not available, the process passes to block 46. Block 46, as described above, illustrates the transmittal of the distribution and the process then returns, as depicted at block 48.

Figure 3:
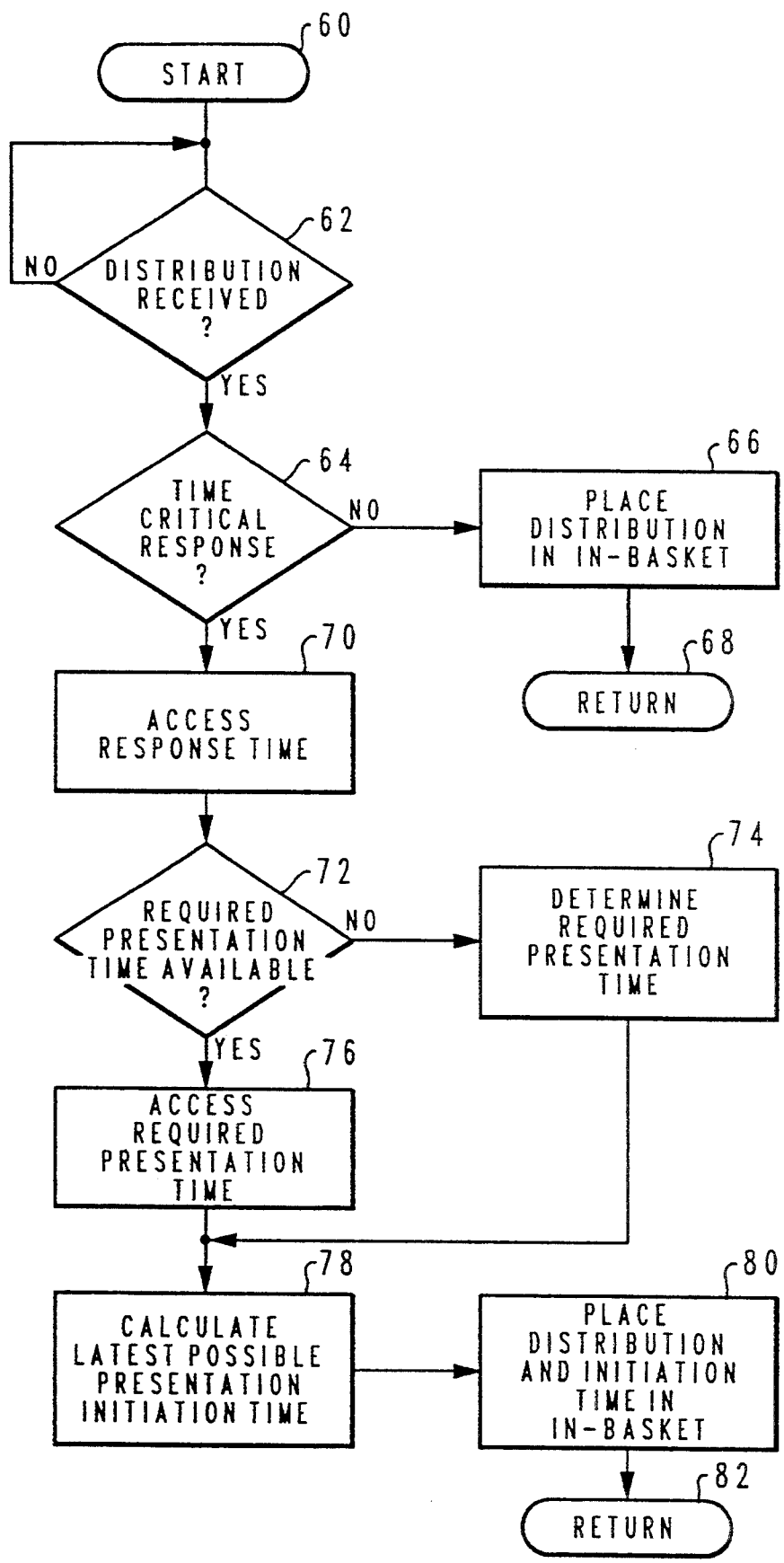
FIG. 3 is a high level logic flowchart illustrating the receipt of a distribution within a data processing system in accordance with the method and system of the present invention.

With reference now to FIG. 3, there is depicted a high level logic flowchart which illustrates a receipt of a distribution within a data processing system, in accordance with the method and system of the present invention. As depicted, the process begins at block 60 and thereafter passes to block 62. Block 62 illustrates a determination of whether or not a distribution has been received. If not, as illustrated, the process merely iterates until such time as a distribution is received.

Still referring to block 62, in the event a distribution is received within the data processing system, the process passes to block 64. Block 64 illustrates a determination of whether or not a time critical response is associated with the received distribution. As described above, a time critical response may constitute a time prior to which an action must be taken, a time prior to which a reply must be entered or a time at which the distribution will become invalid. If no time critical response is associated with the received distribution the process passes to block 66. Block 66 illustrates the placing of the distribution in the in-basket of the addressee user and the process then passes to block 68 and returns.

Still referring to block 64, in the event a time critical response is associated with the received distribution, the process passes to block 70. Block 70 illustrates the accessing of the required response time, which has previously been bound to the distribution (see FIG. 2). Next, the process passes to block 72.

Block 72 illustrates a determination of whether or not a required presentation time is available in association with the received distribution. if not, the process passes to block 74. Block 74, in accordance with an important feature of the present invention, illustrates a determination of the required presentation time which is necessary to present the received distribution, or some salient portion thereof. Those skilled in the art will appreciate that sufficient data to permit a response to a multimedia presentation may be contained within some designated portion of the presentation. This may be simply accomplished by presenting the received distribution within the data processing system, without actually displaying the distribution to the user, in order to determine the amount of time required to complete the presentation.

Alternately, the required presentation time may be determined by accessing various timing signals which may be associated with a multimedia or audio presentation. Additionally, in the event the received distribution constitutes a textual presentation, the number of words contained within the textual presentation may be utilized to determine the required presentation time by dividing that number by an average reading speed or a reading speed which has been entered by the user. Utilizing any of the aforementioned techniques, the required presentation time necessary to present the entire distribution to the recipient or some salient portion thereof, is therefore determined.

Still referring to block 72, in the event a required presentation time is available, the process passes to block 76. Block 76 illustrates the accessing of the required presentation time which was previously bound to the distribution (see FIG. 2). Thereafter, or after determining the required presentation time as described with respect to block 74, the process passes to block 78. Block 78 illustrates the calculation of the latest possible presentation initiation time for a response to the received distribution prior to the designated response time. Those skilled in the art will appreciate that this may be determined by simply determining the required response time and then "backing up" by the amount of time required to present the entire distribution, or some salient portion thereof.

Additionally, as those skilled in the art will appreciate, an amount of time required to formulate the response may also be subtracted from the specified response time in order to permit the user to create a response following a presentation of the received distribution. For example, if a received multimedia distribution has a required response time of 3:00 p.m. and a two hour presentation time, the latest possible presentation initiation time may be determined to be 12:30 p.m., where one half hour has been designated as the amount of time necessary to formulate a response time.

After calculating the latest possible presentation initiation time as described above, the process passes to block 80. Block 80 illustrates the placing of the distribution and the latest possible presentation initiation time within the user's in-basket and thereafter, the process passes to block 82 and returns.

Figure 4:
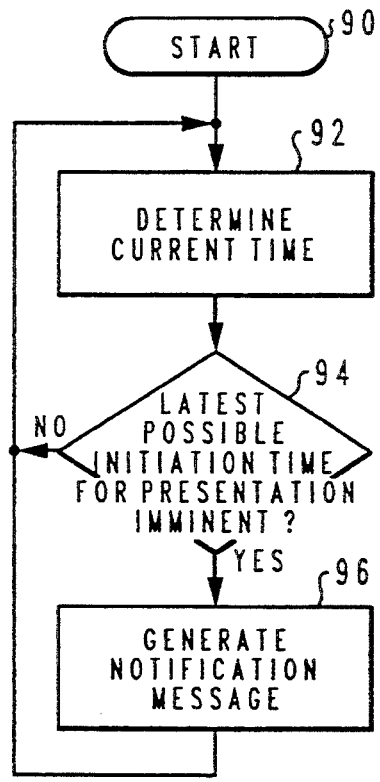
FIG. 4 is a high level logic flowchart illustrating the management of a response to a distribution within a data processing system in accordance with the method and system of the present invention.

Finally, referring to FIG. 4, there is depicted a high level logic flowchart which illustrates the management of a response to a distribution within a data processing system in accordance with the method and system of the present invention. As depicted, the process begins at block 90 and thereafter passes to block 92. Block 92 illustrates a determination of the current time. Thereafter, the process passes to block 94. Block 94 illustrates a determination of whether or not the latest possible initiation time for a selected presentation is imminent and if not, the process merely iterates by returning to block 92 to once again determine the current time. In the alternative, if the determination illustrated within block 94 is that the latest possible initiation time for a selected presentation is imminent, the process passes to block 96. Block 96 illustrates the generation and presentation of a notification message to the user. Those skilled in the art will appreciate that this generation of a notification message may comprise an audio or textual message or alternatively, may comprise a textual message with an audible alert. Thereafter, the process returns in an iterative fashion to block 92 to continue to determine the current time and check for additional latest possible initiation times for the presentation of one or more distributions which may have been received by the user, in accordance with the method and system of the present invention.

Upon reference to the foregoing those skilled in the art will appreciate that the Applicant's herein have described a method and system whereby a time critical response to a distribution within a data processing system may be efficiently managed by determining and taking into account the amount of time required to present a distribution within the data processing system to a recipient, such that a response to that distribution may be formulated prior to the critical response time, by generating a notification message to the recipient which predates the latest possible initiation time for presentation which permits a response to be formulated thereafter.

While the invention has been particularly shown and described with reference to a preferred embodiment, it will be understood by those skilled in the art that various changes in form and detail may be made therein without departing from the spirit and scope of the invention.

We claim:

1. A method in a data processing system having a plurality of users at multiple user stations enrolled therein for efficiently managing a response to a distribution within said data processing system, said method comprising the steps of:

automatically determining a period of time required to present a selected distribution to a user in response to a receipt of said selected distribution at a user station;

determining a specified time for response to said selected distribution;

calculating a latest possible presentation initiation time which permits completion of presentation of said selected distribution to said user prior to said specified time for response to said selected distribution; and automatically generating and presenting a notification to said user within said data processing system prior to said calculated latest possible presentation initiation time wherein said user may efficiently respond to said distribution prior to said specified time.

2. The method in a data processing system having a plurality of users at multiple user stations enrolled therein for efficiently managing a response to a distribution within said data processing system according to claim 1, wherein said distribution comprises an audio-visual presentation and wherein said step of automatically determining a period of time required to present a selected distribution to a user comprises the step of presenting said audio-visual presentation within said data processing system while timing said audio-visual presentation in response to a receipt of said audio-visual presentation at a user station.

3. The method in a data processing system having a plurality of users at multiple user stations enrolled therein for efficiently managing a response to a distribution within said data processing system according to claim 1, wherein said distribution comprises a textual presentation and wherein said step of automatically determining a period of time required to present a selected distribution to a user comprises the step of determining a number of words within said textual presentation and dividing said number of words by a predetermined reading speed in response to a receipt of said textual presentation at a user station.

4. The method in a data processing system having a plurality of users at multiple user stations enrolled therein for efficiently managing a response to a distribution within said data processing system according to claim 1, wherein said selected distribution includes a designated time for response specified by an originator of said selected distribution and wherein said step of determining a specified time for response to said selected distribution comprises the step of accessing said designated time for response included with said selected distribution.

5. The method in a data processing system having a plurality of users at multiple user stations enrolled therein for efficiently managing a response to a distribution within said data processing system according to claim 1, wherein said selected distribution includes a designated period of time required to present said selected distribution to a user and wherein said step of automatically determining a period of time required to present a selected distribution to a user in response to a receipt of said selected distribution at a user station comprises the step of accessing said designated period of time required to present said selected distribution to a user included with said selected distribution in response to a receipt of said selected distribution at a user station.

6. The method in a data processing system having a plurality of users at multiple user stations enrolled therein for efficiently managing a response to a distribution within said data processing system according to claim 1, wherein said step of automatically generating a notification to said user within said data processing system prior to said calculated latest possible presentation initiation time comprises the step of automatically generating an audible notification to said user within said data processing system prior to said calculated latest possible presentation initiation time.

7. A data processing system for efficiently managing a response to a distribution within said data processing system, said data processing system having a plurality of users at multiple user stations enrolled therein, said data processing system comprising:

means for automatically determining a period of time required to present a selected distribution to a user in response to a receipt of said selected distribution at a user station;

means for determining a specified time for response to said selected distribution;

means for calculating a latest possible presentation initiation time which permits completion of presentation of said selected distribution to said user prior to said specified time for response to said selected distribution; and means for automatically generating and presenting a notification to said user within said data processing system prior to said calculated latest possible presentation initiation time wherein said user may efficiently respond to said distribution prior to said specified time.

8. The data processing system for efficiently managing a response to a distribution within said data processing system according to claim 7, wherein said distribution comprises an audio-visual presentation and wherein said means for automatically determining a period of time required to present a selected distribution to a user comprises means for presenting said audiovisual presentation within said data processing system while timing said audio-visual presentation in response to a receipt of said audio-visual presentation at a user station.

9. The data processing system for efficiently managing a response to a distribution within said data processing system according to claim 7, wherein said distribution comprises a textual presentation and wherein said means for automatically determining a period of time required to present a selected distribution to a user comprises means for determining a number of words within said textual presentation and dividing said number of words by a predetermined reading speed in response to a receipt of said textual presentation at a user station.

10. The data processing system for efficiently managing a response to a distribution within said data processing system according to claim 7, wherein said selected distribution includes a designated time for response specified by an originator of said selected distribution and wherein said means for determining a specified time for response to said selected distribution comprises means for accessing said designated time for response included with said selected distribution.

11. The data processing system for efficiently managing a response to a distribution within said data processing system according to claim 7, wherein said selected distribution includes a designated period of time required to present said selected distribution to a user and wherein said means for automatically determining a period of time required to present a selected distribution to a user in response to a receipt of said selected distribution at a user station comprises means for accessing said designated period of time required to present said selected distribution to a user included with said selected distribution in response to a receipt of said selected distribution at a user station.

12. The data processing system for efficiently managing a response to a distribution within said data processing system according to claim 7, wherein said means for automatically generating a notification to said user within said data processing system prior to said calculated latest possible presentation initiation time comprises means for automatically generating an audible notification to said user within said data processing system prior to said calculated latest possible presentation initiation time.

* * * * *